United States Patent
Shimada

(10) Patent No.: US 7,791,760 B2
(45) Date of Patent: Sep. 7, 2010

(54) RECORDING-MEDIUM PROFILE CORRECTION TO ACHIEVE COLOR MATCHING

(75) Inventor: Takuya Shimada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1076 days.

(21) Appl. No.: 11/068,793

(22) Filed: Mar. 2, 2005

(65) Prior Publication Data

US 2005/0195417 A1    Sep. 8, 2005

(30) Foreign Application Priority Data

Mar. 3, 2004  (JP)  ............... 2004-059235
Dec. 22, 2004  (JP)  ............... 2004-371885

(51) Int. Cl.
G06F 15/00  (2006.01)
H04N 1/40  (2006.01)
G06K 9/00  (2006.01)
B41J 2/21  (2006.01)

(52) U.S. Cl. ............... 358/1.9; 382/167; 347/43; 358/3.23

(58) Field of Classification Search ............... None
See application file for complete search history.

(56) References Cited

U.S. PATENT DOCUMENTS

| | | | | |
|---|---|---|---|---|
| 6,108,008 A | | 8/2000 | Ohta | 345/590 |
| 6,160,912 A | * | 12/2000 | Usami | 382/167 |
| 6,331,042 B1 | | 12/2001 | Yamada | 347/19 |
| 7,003,151 B2 | | 2/2006 | Shimada | 382/162 |
| 2002/0118378 A1 | * | 8/2002 | Budell | 358/1.9 |
| 2003/0030828 A1 | * | 2/2003 | Soler et al. | 358/1.9 |
| 2003/0048464 A1 | | 3/2003 | Yamada | 358/1.9 |
| 2003/0164960 A1 | * | 9/2003 | Housel | 358/1.9 |
| 2003/0172839 A1 | * | 9/2003 | Tyrell et al. | 106/31.5 |
| 2003/0202194 A1 | | 10/2003 | Torigoe et al. | 358/1.9 |
| 2003/0218656 A1 | * | 11/2003 | Yamazaki et al. | 347/43 |
| 2005/0264837 A1 | | 12/2005 | Shimada | 358/1.9 |
| 2006/0012809 A1 | | 1/2006 | Shimada | 358/1.9 |

FOREIGN PATENT DOCUMENTS

| | | |
|---|---|---|
| JP | 7-210682 | 8/1995 |
| JP | 10-6562 | 1/1998 |
| JP | 2000-346707 | 12/2000 |

OTHER PUBLICATIONS

Office Action dated May 7, 2009 in JP 2004-371885.

* cited by examiner

*Primary Examiner*—Twyler L Haskins
*Assistant Examiner*—Barbara D Reinier
(74) *Attorney, Agent, or Firm*—Fitzpatrick, Cella Harper & Scinto

(57) ABSTRACT

Color appearances do not satisfactorily match between recording paper sheets with different gloss characters even using a colorimetric matching process. Hence, the differences between the gloss characters of the recording paper sheets are obtained as correction amounts, and a media profile indicating correspondence between color signals of an image forming apparatus and calorimetric signals corresponding to recording paper is corrected on the basis of the obtained correction amounts.

7 Claims, 8 Drawing Sheets

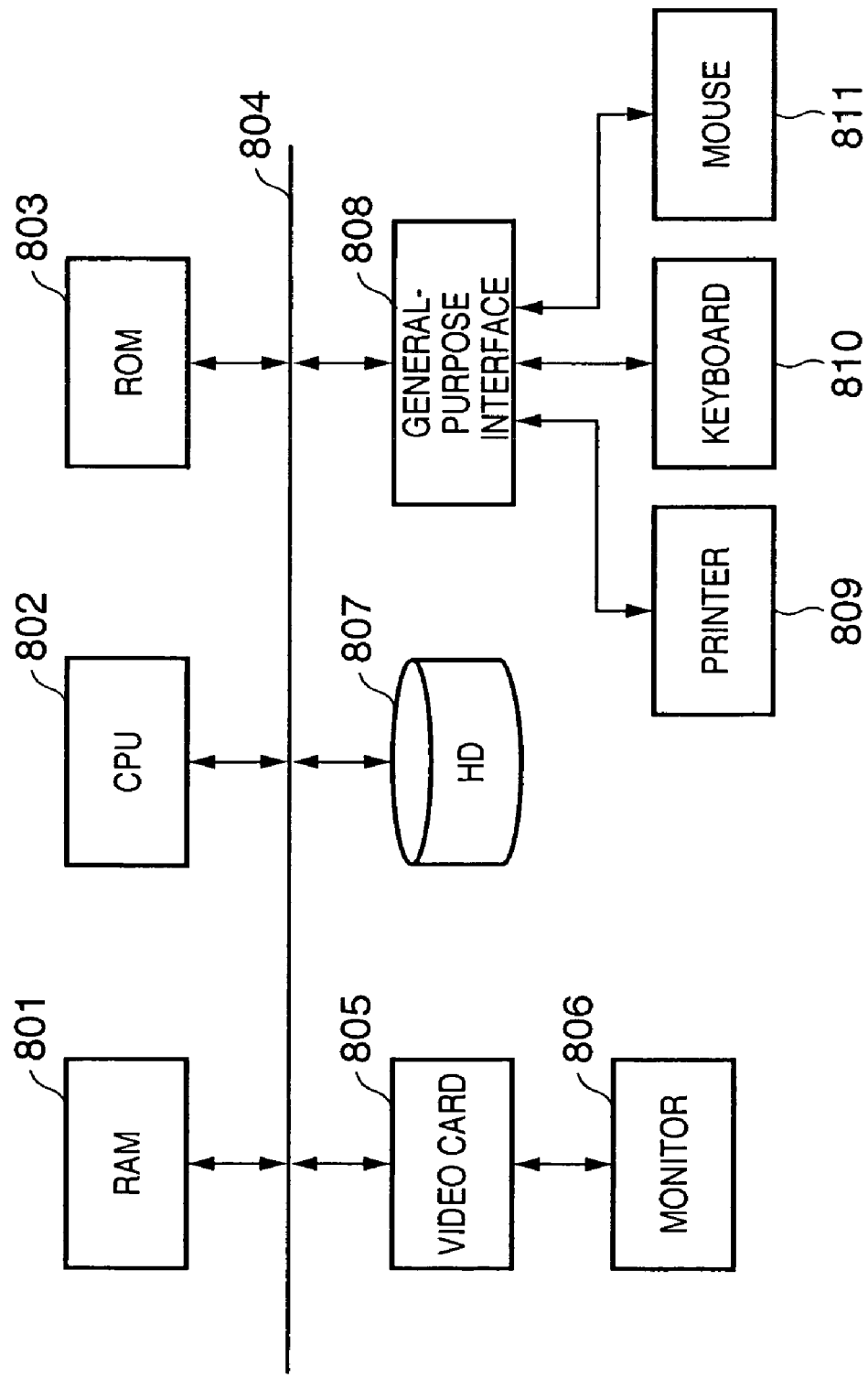

US 7,791,760 B2

RECORDING-MEDIUM PROFILE CORRECTION TO ACHIEVE COLOR MATCHING

FIELD OF THE INVENTION

The present invention relates to a color processing apparatus and method and, more particularly, to a color process used to attain the same color appearance among recording media having different gloss characters.

BACKGROUND OF THE INVENTION

A color process that applies color correction according to the types of recording media is known (U.S. Pat. No. 6,108, 008). Also, a color process used to realize a color appearance of target recording paper on different recording paper sheets is proposed.

FIG. 7 is a block diagram for explaining a color signal process for recording an image of the same color appearance on different recording paper sheets. FIG. 7 shows a color signal process that realizes a color appearance on target recording paper A on recording paper B having a different color reproduction character. In FIG. 7, input color signals R, G, and B are converted into print color signals Rd, Gd, and Bd via a target color converter 5001, mapping section 5002, and media color converter 5003.

More specifically, the target color converter 5001 converts the input color signals into colorimetric signals Lt, At, and Bt of the target recording paper A. The calorimetric signals are color signals that pertain to colorimetric values of colors printed on recording paper, and color signals on a CIEXYZ color space, those on a CIELAB color space, those on a color appearance model color space, and the like are used. A target profile storage section 5004 stores a three-dimensional lookup table (3DLUT) indicating the relationship between the discrete input color signals R, G, and B and colorimetric signals Lt, At, and Bt of the target recording paper A corresponding to the color signals R, G, and B as a target profile. The target color converter 5001 converts color signals by a known interpolation method by utilizing this target profile.

The mapping section 5002 converts the colorimetric signals Lt, At, and Bt into colorimetric signals Ld, Ad, and Bd that can be reproduced on the recording paper B. Since color gamuts that can be reproduced vary depending on the recording paper sheets that are being used, if a given color signal can be reproduced on the recording paper A but cannot be reproduced on the recording paper B, all color signals that can be reproduced on the recording paper A are converted into those which can be reproduced on the recording paper B so as not to change the impression of the color appearance. Basically, a color signal that can be reproduced on the recording paper B is reproduced using nearly the same color without applying any large change, and a color signal in a high saturation area is converted into a color signal whose saturation is compressed while its hue value remains the same. In other words, gamut mapping is performed such that the color gamut of the recording paper A is compressed into that which can be reproduced on the recording paper B. A mapping parameter storage section 5005 stores parameters associated with saturation mapping conditions. The mapping section 5002 converts color signals by known gamut mapping by utilizing these parameters.

The media color converter 5003 converts the colorimetric signals Ld, Ad, and Bd into the printer color signals Rd, Gd, and Bd to be reproduced on the recording paper B. A media profile storage section 5006 stores a 3DLUT indicating the relationship between the discrete printer color signals Rd, Gd, and Bd and calorimetric signals Ld, Ad, and Bd of the recording paper B corresponding to the color signals Rd, Gd, and Bd as a media profile. The media color converter 5003 converts color signals by a known interpolation method by utilizing this media profile.

According to the aforementioned color signal processing method, the recording paper B which has a color reproduction character different from that of the target recording paper A can realize the color reproduction character of the recording paper A.

However, if the gloss character of recording paper varies, good color appearance cannot often be realized by the aforementioned color signal processing method. This results from differences between the illumination upon colorimetry and the geometrical condition of light receiving, and illumination upon image observation and the geometrical condition of the observation direction. Reflected light that comes from a print image and enters the eye of an image observer includes two different components. One component is a diffuse component (to be referred to as "diffuse light" hereinafter) of illumination light, which enters recording paper, and emerges from the recording paper after it has undergone a large number of times of reflection and refraction by paper texture and color materials. The other component is a reflected component (to be referred to as "surface-reflected light" hereinafter) from the relatively smooth surface of recording paper.

A general colorimeter used upon generating a printer profile has a geometric condition called 45-n or -45, which extracts only the aforementioned diffuse light, and does not detect any surface-reflected light. Recording paper which has a small amount of surface-reflected light, recording paper which has a large amount of surface-reflected light but can remove most of it from the field of view upon image observation, and recording paper the surface-reflected light of which enters the eye of an image observer have different appearances of print images even when the colorimetric values are the same. That is, among recording paper sheets having different gloss characters, good color appearance cannot be obtained using the aforementioned color signal processing method.

SUMMARY OF THE INVENTION

The first aspect of the present invention discloses a color process comprising the steps of: converting input color signals into calorimetric signals corresponding to a first recording medium using a profile of the first recording medium; mapping the calorimetric signals into a color gamut that can be reproduced by a second recording medium; converting the mapped colorimetric signals into output color signals using a profile of the second recording medium; obtaining a difference between gloss characters of the first and second recording media; and correcting the profile based on the obtained difference between the gloss characters.

With this color process, color signals that can realize the same color appearance between recording media having different gloss characters can be generated.

The second aspect of the present invention discloses a color process comprising the steps of: acquiring a profile of a first recording medium, wherein the profile holds correspondence between colorimetric signals and color data of a device; obtaining correspondence between a color on the first recording medium and a color on a second recording medium by visual observation; calculating a difference between color information indicating the color on the first recording medium and color information indicating the color on the second recording medium; and correcting the calorimetric signals in the profile of the first recording medium using the difference.

With this color process, the color appearance of the first recording medium can be matched with that of the second recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a block diagram showing the arrangement of an information processing apparatus which implements correction of a profile.

DETAILED DESCRIPTION OF THE PREFERRED EMBODIMENTS

Figure 1:
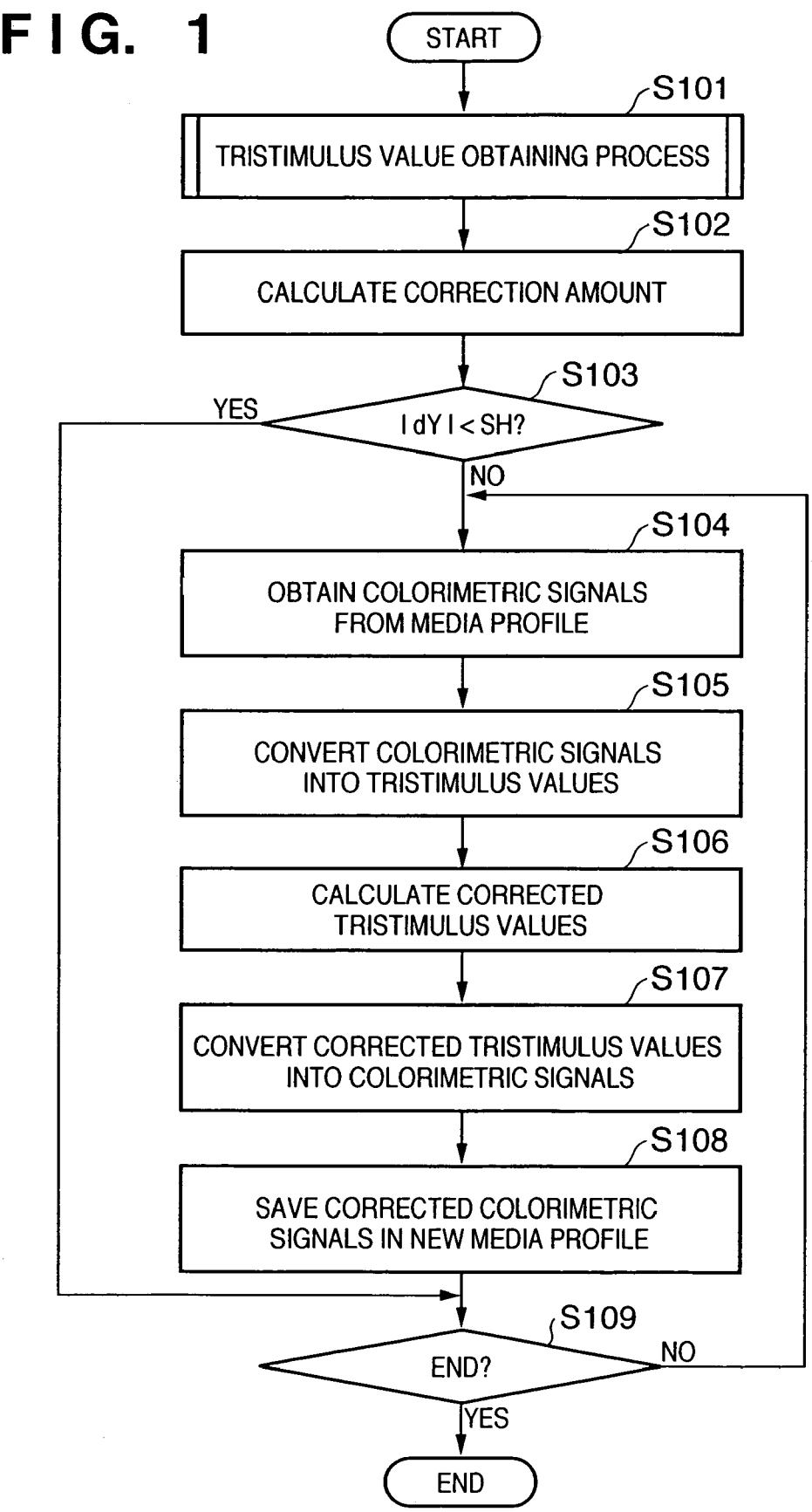
FIG. 1 is a flowchart showing a profile correction sequence.

A color process (profile correction) as an embodiment according to the present invention will be described in detail hereinafter with reference to the accompanying drawings.

First Embodiment

Overview

When an image output apparatus realizes the color appearance of target recording paper A on recording paper B with a different gloss character, it corrects a profile of the recording paper B. This profile is a 3DLUT indicating the relationship between the color signals of the image output apparatus and calorimetric signals of the recording paper B corresponding to these color signals. The profile is corrected by correcting the calorimetric signals of the recording paper B on the basis of the difference between the gloss characters of the recording paper sheets A and B.

Let X0, Y0, and Z0 be tristimulus values corresponding to the colorimetric signals of the recording paper B, and X1, Y1, and Z1 be those corresponding to corrected calorimetric signals. Then, from the color of the recording paper A and that of the recording paper B, which have an appearance of the same impression, tristimulus values Xa, Ya, and Za of the color of the recording paper A and tristimulus values Xb, Yb, and Zb of the color of the recording paper B are obtained, and the tristimulus values X1, Y1, and Z1 are calculated from the tristimulus values X0, Y0, and Z0 by:

$$X1 = X0 + (Xa - Xb) \quad (1)$$

$$Y1 = Y0 + (Ya - Yb) \quad (2)$$

$$Z1 = Z0 + (Za - Zb) \quad (3)$$

Equations (1) to (3) effect as follows to correct the influence of the difference between the gloss characters of the recording paper sheets A and B.

As described above, reflected light which comes from an image and enters the eye of the image observer includes diffuse light associated with the colorimetric values (tristimulus values) and surface-reflected light which is not included in the colorimetric values. Therefore, reflected light Qa which comes from an image and enters the eye of the image observer of the recording paper A is given by:

$$Qa = Ma + Sa \quad (4)$$

where Ma is the calorimetric value, and Sa is surface-reflected light based on the gloss character of the recording paper A.

Likewise, reflected light Qb which comes from an image and enters the eye of the image observer of the recording paper B is given by:

$$Qb = Mb + Sb \quad (5)$$

where Mb is the colorimetric value, and Sb is surface-reflected light based on the gloss character of the recording paper B.

Figure 7:
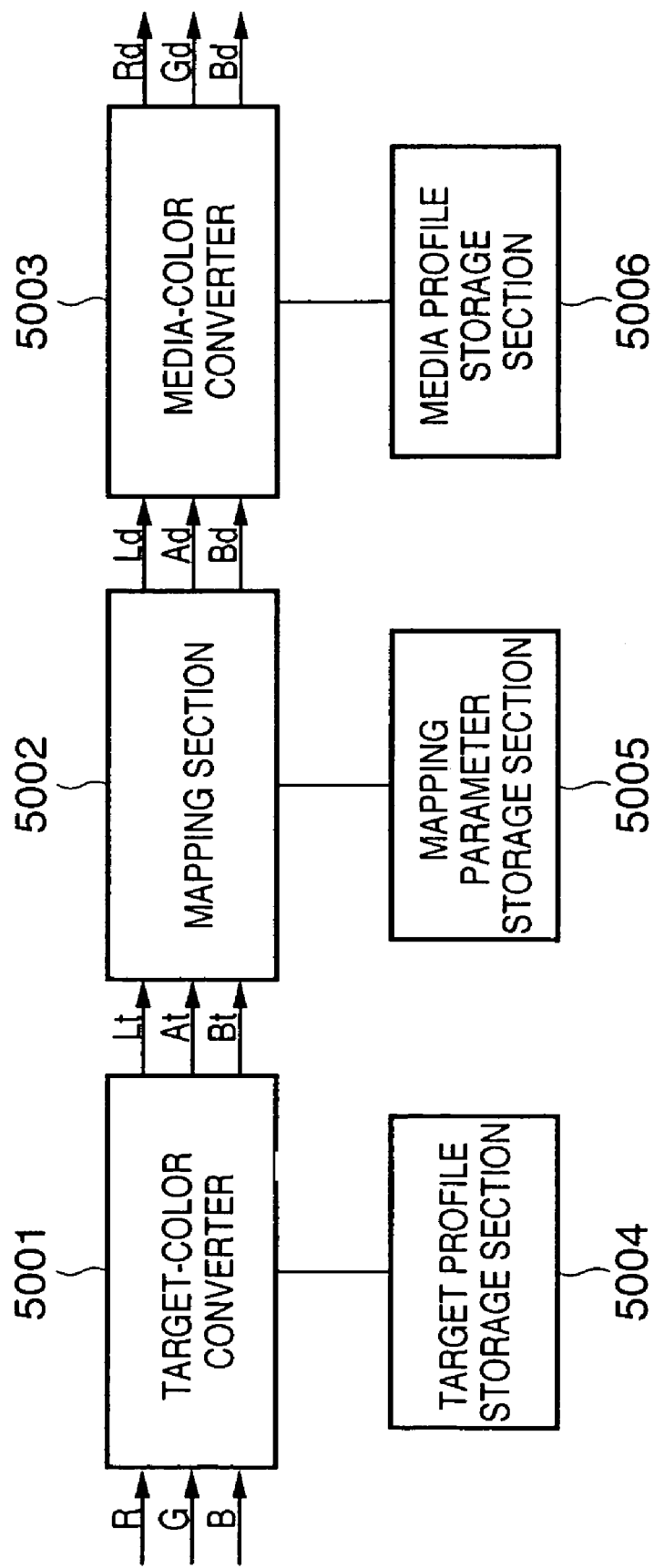
FIG. 7 is a block diagram for explaining a color signal process for recording images with the same color appearance on different recording paper sheets.

The color signal processing method shown in FIG. 7 processes color signals so that the colorimetric values Ma and Mb match. However, when the surface-reflected light Sa is different from the surface-reflected light Sb, the reflected light Qa which comes from an image and enters the eye of the image observer does not match the reflected light Qb, and the same color appearance cannot be attained on the recording paper sheets A and B. Hence, in order to match reflected light which come from images and enter the eye of the image observer, the calorimetric value Mb of the recording paper B is converted into Mb' given by:

$$Mb' = Mb + Sb - Sa \quad (6)$$

In the aforementioned color signal processing method, when the color signal process is done to match the colorimetric value Ma of the recording paper A with Mb', equation (7) holds, and Qa given by equation (4) and Qb given by equation (5) match.

$$Ma = Mb + Sb - Sa \quad (7)$$

That is, reflected light which come from images and enter the eye of the image observer match on the recording paper sheets A and B, and the same color appearance can be attained.

In order to implement conversion given by equation (6), the colorimetric values of colors of the recording paper sheets A and B, which have the same appearance, are used. Let Ta be the tristimulus value of a given color of the recording paper A, and Tb be that of a given color of the recording paper B. Then, from equations (4) and (5) above, we have:

$$Ta + Sa = Tb + Sb \quad (8)$$

Using equation (8), equation (6) can be rewritten as:

$$Mb' = Mb + (Ta - Tb) \quad (9)$$

where Mb is the colorimetric value of the recording paper B. Mb' is the corrected colorimetric value used in place of Mb. The colorimetric values Mb, Mb', Ta and Tb correspond to the tri-stimulus values (X0, Y0, Z0), (X1, Y1, Z1), (Xa, Ya, Za) and (Xb, Yb, Zb). That is, the conversion given by equations (1) to (3) is equal to that given by equation (9) and, hence, to that given by equation (6). The conversion given by equation (6) effects to match reflected light which come from images and enter the eye of the image observer on the recording paper sheets A and B, and can realize the color appearance of the recording paper A on the recording paper B.

The method of correcting the profile of the recording paper B upon realizing the color appearance of the target recording paper A on the recording paper B having a different gloss character will be described in detail below. The profile of the recording paper B is a media profile stored in the media profile storage section 5006 shown in FIG. 7. Using the profile corrected by the profile correction method to be described below, the color appearance of the recording paper A can be realized on the recording paper B having a different gloss character by the aforementioned color signal processing method.

[Profile]

The profile of this embodiment will be described in detail first.

The profile of this embodiment is a 3DLUT that indicates the relationship between the discrete printer color signals Rd, Gd, and Bd, and the corresponding colorimetric signals Ld, Ad, and Bd of the recording paper B. The printer color signals Rd, Gd, and Bd are 8-bit signals at, e.g., 9×9×9 grid points, and are 729 color signals (Rd, Gd, Bd)=(0, 0, 0), (0, 0, 32), (0, 0, 64), . . . , (0, 0, 240), (0, 0, 255), (0, 32, 0), . . . , (255, 255, 255). Note that the number of grid points is not limited to 9×9×9, but may be determined arbitrarily.

The colorimetric signals Ld, Ad, and Bd are color signals associated with the calorimetric values of the recording paper B corresponding to the printer color signals Rd, Gd, and Bd, and color signals on a CIEXYZ color space, those on a CIELAB color space, those on a color appearance model color space, and the like are used. By utilizing the 3DLUT (i.e., the profile) and a known interpolation method, colorimetric signals Ld, Ad, and Bd corresponding to arbitrary printer color signals Rd, Gd, and Bd can be calculated. Furthermore, printer color signals Rd, Gd, and Bd corresponding to arbitrary calorimetric signals Ld, Ad, and Bd in a color gamut that can be reproduced on the recording paper B can be calculated.

Also, the color signals on the CIEXYZ color space, those on the CIELAB color space, those on the color appearance model color space, and the like allow mutual conversions. Hence, using the profile, tristimulus values Xd, Yd, and Zd (color signals on the CIEXYZ color space) corresponding to arbitrary printer color signals Rd, Gd, and Bd can be calculated. The profile correction process of this embodiment changes colorimetric signals Ld, Ad, and Bd on the basis of the differences of the gloss characters of recording paper sheets.

[Arrangement]

FIG. 8 is a block diagram showing the arrangement of an information processing apparatus that executes profile correction.

A CPU 802 executes programs stored in a ROM 803 and hard disk (HD) 807 using a RAM 801 as a work memory, so as to execute various processes including the color signal processes (to implement the processes of the target color converter 5001, mapping section 5002, and media color converter 5003) shown in FIG. 7 and a profile correction process to be described later, and to control respective components connected to a system bus 804. A video card 805 displays an image on a monitor 806 under the control of the CPU 802. A general-purpose interface 808 comprises a serial bus such as a Universal Serial Bus (USB) or the like, and can connect a printer 809, keyboard 810, pointing device 811 (e.g., a mouse), and the like. Note that the target profile storage section 5004, mapping parameter storage section 5005, and media profile storage section 5006 shown in FIG. 7 can be assigned to the HD 807.

[Profile Correction Sequence]

FIG. 1 is a flowchart showing a profile correction sequence, i.e., the processes to be executed by the CPU 802.

As will be described in detail later, the user compares and observes print images on the recording paper sheets A and B to obtain a color of the recording paper A and that of the recording paper B, which have the same appearance, thereby executing a tristimulus value obtaining process for obtaining tristimulus values Xa, Ya, and Za of the color of the recording paper A, and tristimulus values Xb, Yb, and Zb of the color of the recording paper B (S101). Correction amounts dX, dY, and dZ are calculated (S102) by:

$$dX = Xa - Xb$$

$$dY = Ya - Yb$$

$$dZ = Za - Zb \quad (10)$$

Next, the values of the correction amounts dX, dY, and dZ are evaluated (S103). If the tristimulus values Xa, Ya, and Za of the recording paper A and the tristimulus values Xb, Yb, and Zb of the recording paper B are equal to each other, it is determined that the gloss character of the recording paper A matches that of the recording paper B, and the media profile need not be corrected. In this way, if the correction amount is sufficiently small, e.g., if the absolute value of the element dY of the correction amounts dX, dY, and dZ is smaller than a predetermined value SH (|dY|<SH), the profile correction process ends.

If |dY|≧SH, colorimetric signals Ld, Ad, and Bd before correction are obtained from the media profile of the recording paper B (S104), and are converted into corresponding tristimulus values X0, Y0, and Z0 by a known color space conversion method (S105). If the colorimetric signals are color signals (tristimulus values) on the CIEXYZ color signal, step S105 can be omitted.

From the tristimulus values X0, Y0, and Z0 and the correction amounts dX, dY, and dZ calculated in step S102, corrected tristimulus values X1, Y1, and Z1 are calculated (S106) by:

$$X1 = X0 + dX$$

$$Y1 = Y0 + dY$$

$$Z1 = Z0 + dZ \quad (11)$$

The corrected tristimulus values X1, Y1, and Z1 are converted into corresponding colorimetric signals Ld', Ad', and Bd' by the known color space conversion method (S107). If the colorimetric signals stored in the media profile are color signals (tristimulus values) on the CIEXYZ color signal, step S107 can be omitted.

The corrected calorimetric signals Ld', Ad', and Bd' are stored in a new profile in the media profile storage section 5006 (S108), and it is checked if all calorimetric signals in the media profile of the recording paper B have been corrected (S109). If colorimetric signals to be corrected still remain, the processes in steps S104 to S108 are repeated. If the media profile before correction is not required or if the media profile of the recording paper B can be restored to a default state anytime, the profile that considers the gloss character (corrected profile) may update the media profile of the recording paper B stored in the media profile storage section 5006 without being saved as a new profile in the media profile storage section 5006.

[Tristimulus Value Obtaining Process]

The process (S101) for obtaining the tristimulus values Xa, Ya, and Za of the color of the recording paper A, and tristimulus values Xb, Yb, and Zb of the color of the recording paper B, which have the same appearance, will be described in detail below.

As a pre-process of the tristimulus value obtaining process, images are printed on respective recording paper sheets, and the user compares and observes these print images to designate a combination of a color of the recording paper A and that of the recording paper B, which have the same appearance. By measuring these colors of the recording paper sheets A and B, tristimulus values which have the same appearance can be obtained. The print images in this case may be color patches of arbitrary colors. However, black color patches that allow easy comparison of surface-reflected light are preferably used. The sense of sight of the human is more sensitive to a change in the lightness of a low lightness area than that of a high lightness area.

The method of obtaining the tristimulus values Xa, Ya, and Za of color of the recording paper A, and the tristimulus values Xb, Yb, and Zb of color of the recording paper B using the profiles of the recording paper sheets A and B stored in the target profile storage section 5004 shown in FIG. 7 without using any calorimeter will be described below so that the tristimulus values Xa, Ya, and Za and the tristimulus values Xb, Yb, and Zb provide the same appearance.

Figure 2:
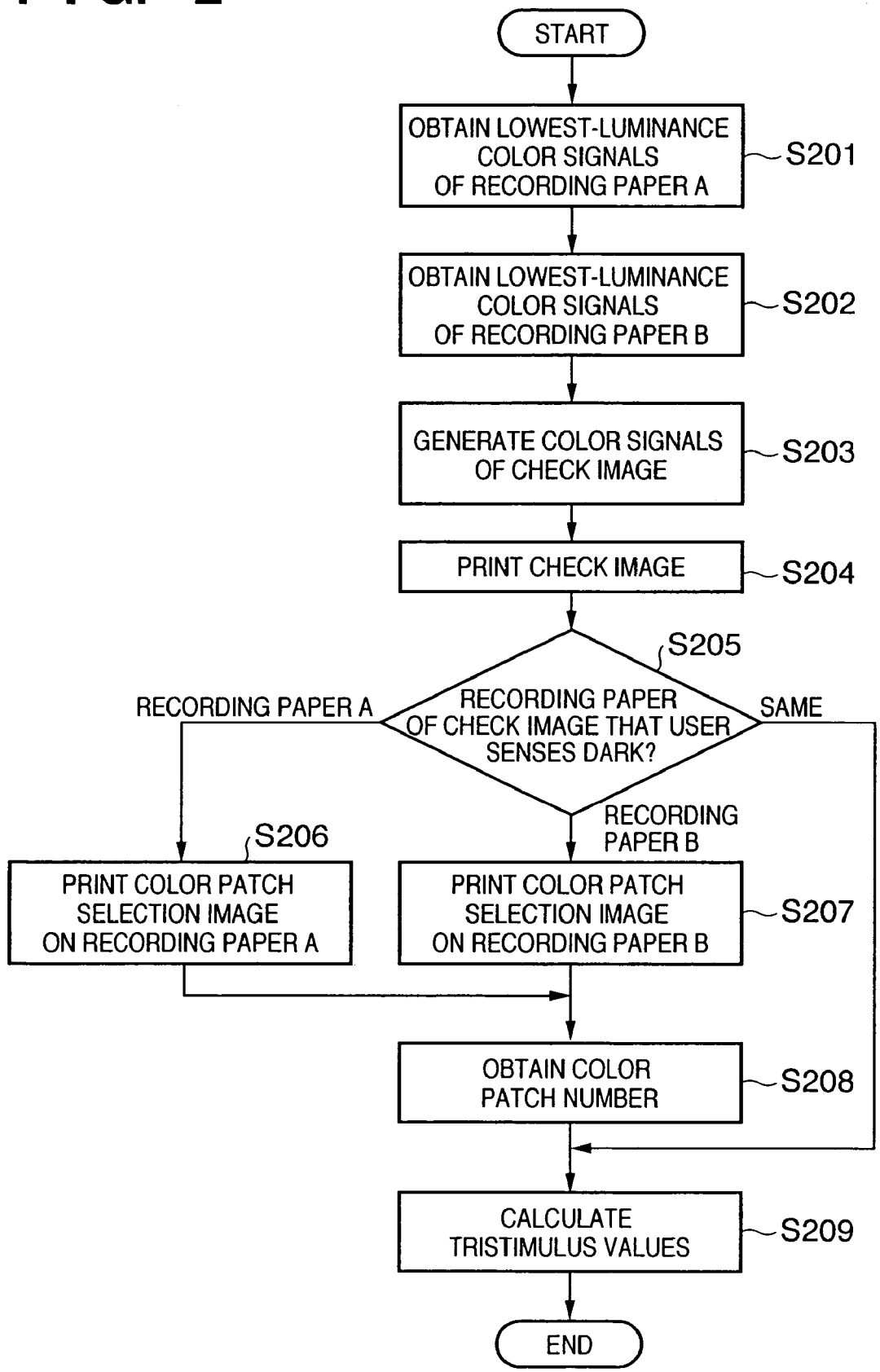
FIG. 2 is a flowchart showing a tristimulus value obtaining sequence.

FIG. 2 is a flowchart showing the tristimulus value obtaining sequence of this embodiment, i.e., the processes to be executed by the CPU 802.

Initially, whether or not color signals in a predetermined colorimetric signal list can be reproduced on the recording paper A is determined based on the profile of the recording paper A and colorimetric signal list using a known method, and colorimetric signals with the lowest lightness value that can be reproduced on the recording paper A are obtained (S201). The colorimetric signal list is a list of color signals which form a color patch selection image to be described later, and is preferably a list of a plurality of color signals whose lightness values, which are most deeply related to the amount of surface-reflected light of recording paper, are changed. For example, the list includes color signals on the CIELAB color space, i.e., 20 color signals (L*, a*, b*)=(0, 0, 0), (2, 0, 0), . . . , (36, 0, 0), (38, 0, 0), which have the a* and b* values=0 and the L* values in increments of 2 from zero.

Next, whether or not the color signals in the calorimetric signal list can be reproduced on the recording paper B is determined based on the profile of the recording paper B and colorimetric signal list using a known method, and colorimetric signals with the lowest lightness value that can be reproduced on the recording paper B are obtained (S202).

The colorimetric signals obtained in step S201 are compared with those obtained in step S202 to determine color signals with a higher lightness value as those of a check image. Using the color signals of the check image and the profile of the recording paper A, color signals Rac, Gac, and Bac of the printer 809, which are required to reproduce the check image on the recording paper A, are generated. Also, using the color signals of the check image and the profile of the recording paper B, color signals Rbc, Gbc, and Bbc of the printer 809, which are required to reproduce the check image on the recording paper B, are generated (S203).

Figure 3:
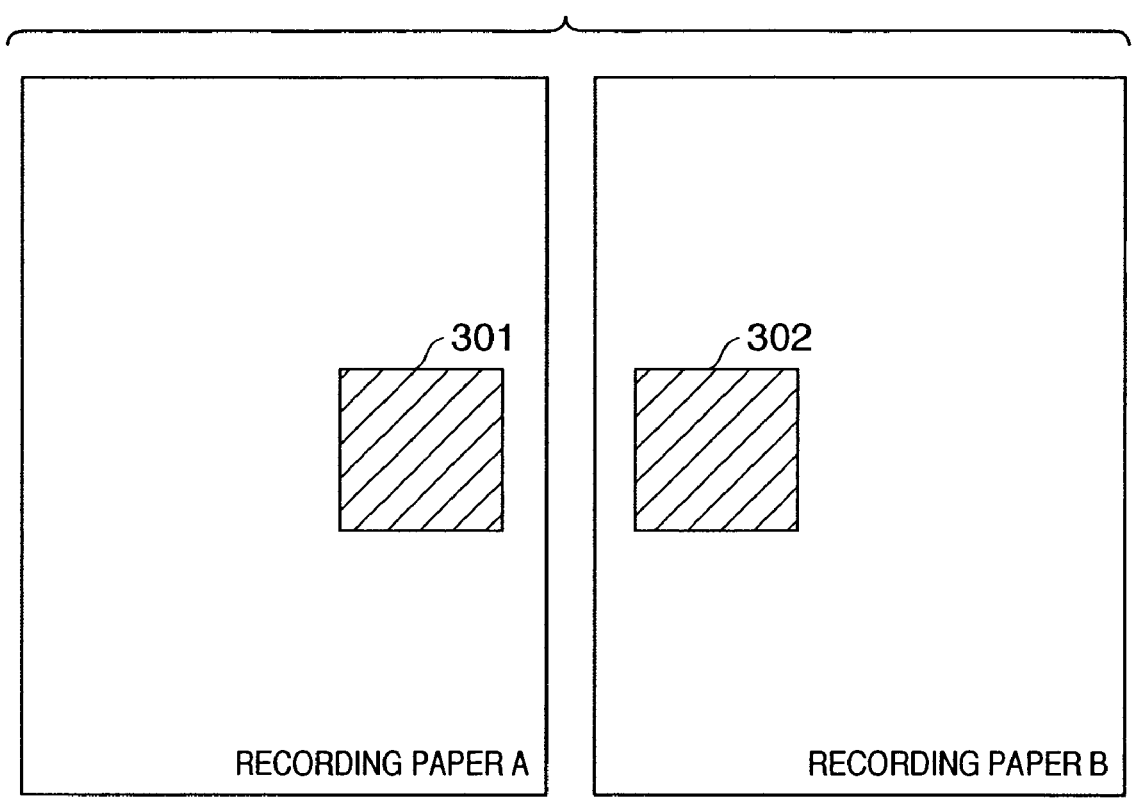
FIG. 3 shows an example of recording paper on which a check image is formed.

Next, the color signals Rac, Gac, and Bac are supplied to the printer 809 to form a check image for the recording paper A on the recording paper A, and the color signals Rbc, Gbc, and Bbc are supplied to the printer 809 to form a check image for the recording paper B on the recording paper B (S204). FIG. 3 shows an example of recording paper sheets on which check images are formed. The check images are printed as color patches 301 and 302 near the edges of the two recording paper sheets to allow easy comparison, and have appropriate sizes. Preferably, the types of recording paper are recorded on the edge portion of the recording paper sheets so as to easily identify the recording paper A or B, as shown in, e.g., FIG. 3. Upon forming the check images, messages "set recording paper A on the printer, and click the [OK] button", "set recording paper B on the printer, and click the [OK] button", and the like are displayed in turn on the monitor 806 to prompt the user to set the designated recording paper. After it is confirmed that the designated recording paper is set upon clicking of, e.g., the [OK] button, the color signals are output to the printer 809.

Of course, check images may be formed on advance on the recording paper sheets A and B. In this case, after a message "prepare for recording paper sheets A and B printed with check images" or the like is displayed, the flow may advance to the process in step S205.

Next, information (evaluation result) of the recording paper with the check image, that the user senses darker, of those on the recording paper sheets A and B is obtained (step S205).

Figure 4:
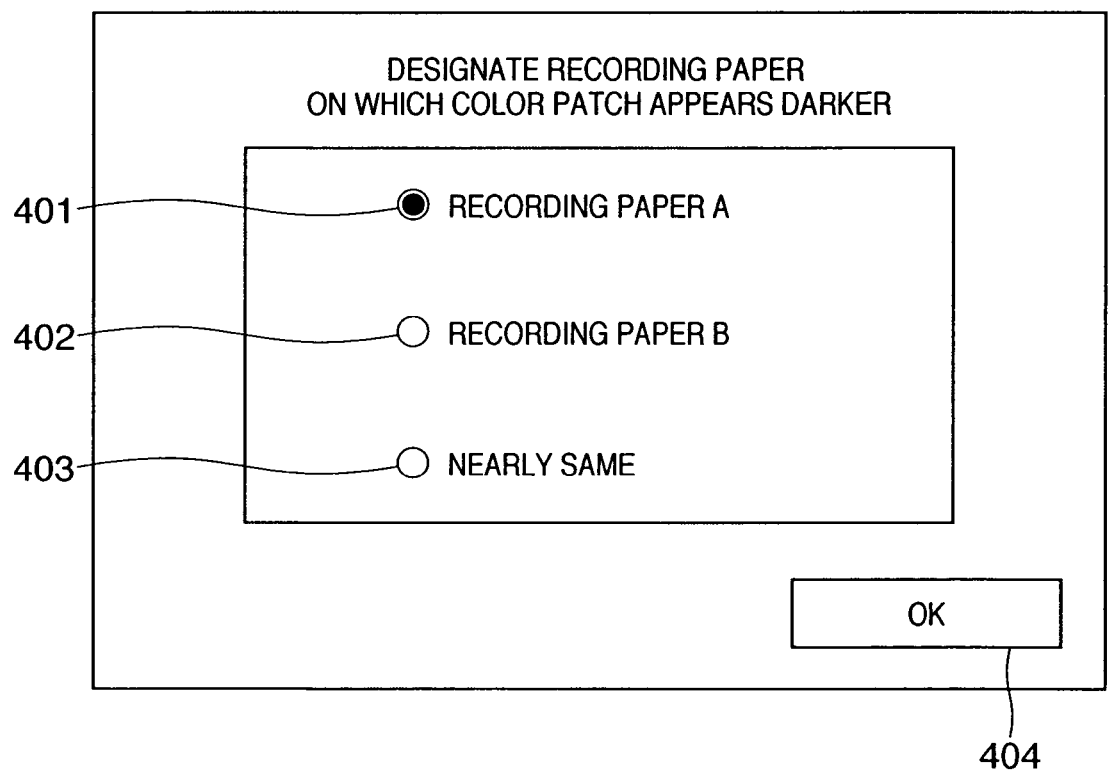
FIG. 4 shows a user interface used to obtain a user's evaluation result.

FIG. 4 shows a user interface used to obtain the user's evaluation result. The user compares the two check images, clicks one of radio buttons shown in FIG. 4, and then clicks an [OK] button, thus inputting information of the recording paper that he or she senses darker. Note that a radio button 401 is selected when the user senses the check image on the recording paper A darker, a radio button 402 is selected when the user senses the check image on the recording paper B darker, and a radio button 403 is selected when the user senses that the two check images have nearly the same lightness. One of the radio buttons 401 to 403 is selected. Of course, the radio button can be reselected until the user clicks an [OK] button 404.

Upon clicking the [OK] button 404, if it is determined that the check image on the recording paper A is darker (upon selection of the radio button 401), a color patch selection image is formed on the recording paper A using the printer 809 (S206). On the other hand, if it is determined that the check image on the recording paper B is darker (upon selection of the radio button 402), a color patch selection image is formed on the recording paper B using the printer 809 (S207). That is, the color signals of the printer 809 required to reproduce respective color signals in the calorimetric signal list on the recording paper A or B are generated from the profile of the recording paper A or B and the colorimetric signal list using the known method, and the color signals are output to the printer 809, thus forming a color patch selection image on the recording paper A or B. Upon forming the color patch selection image on the recording paper, a message "set recording paper A (or B) on the printer, and click the [OK] button" or the like is displayed on the monitor 806 to prompt the user to set the designated paper sheet. After it is confirmed that the designated recording paper is set upon clicking of, e.g., the [OK] button, the color signals are output to the printer 809.

Of course, color patch selection images may be formed in advance on the recording paper sheets A and B. In such case, after a message "prepare for recording paper X printed with the color patch selection image" (X=A or B in this embodiment) or the like is displayed in step S206 or S207, the flow may advance to the process in step S208.

Figure 5:
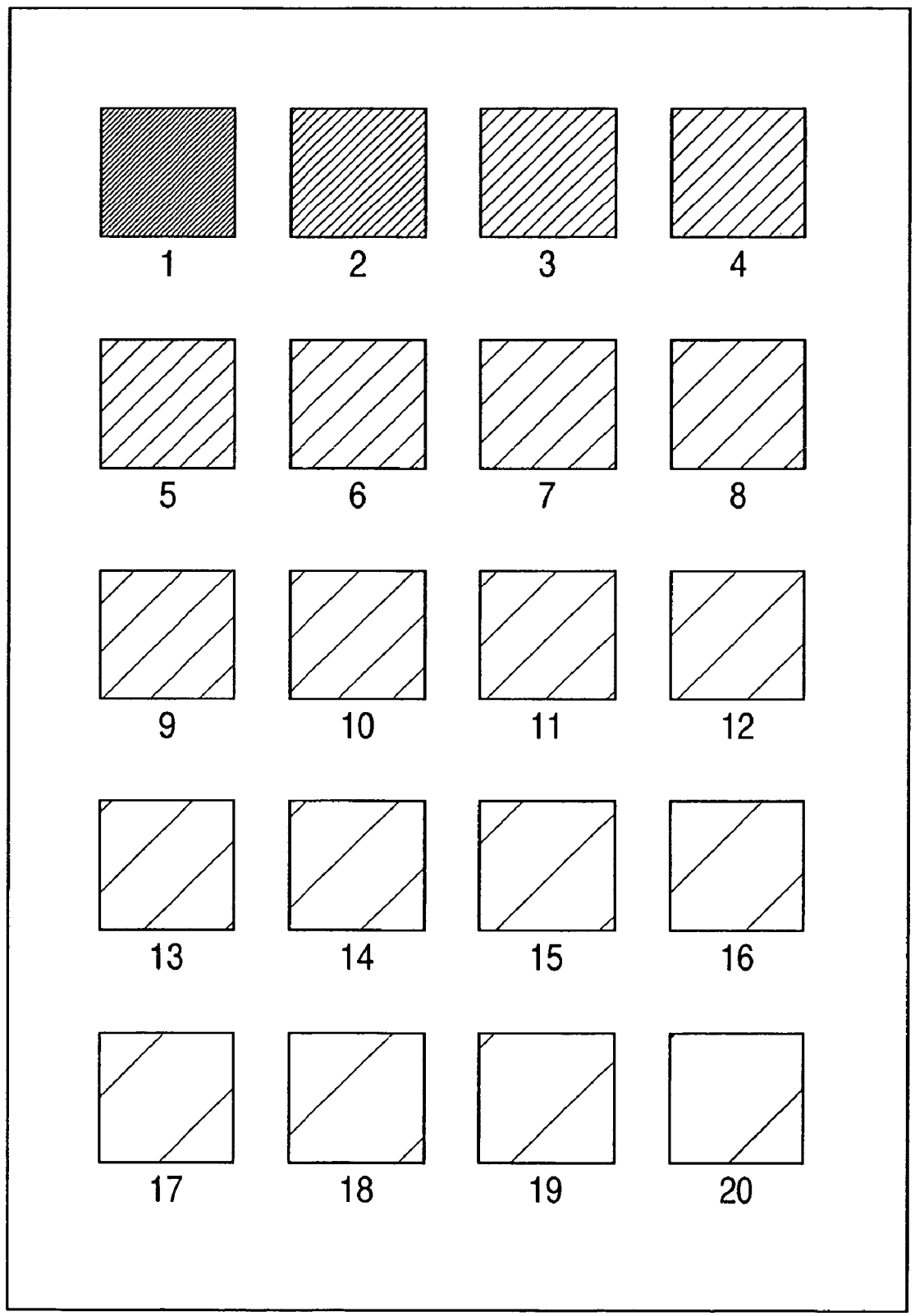
FIG. 5 is a view for explaining a color patch selection image.

FIG. 5 is a view for explaining the color patch selection image. The color patch selection image is a group of color patch images as a layout of colors in the colorimetric signal list. The color patches have an appropriate size to allow easy comparison, and are assigned numbers (e.g., from 1 to 20) for selection (to be described later), as shown in FIG. 5.

If it is determined that the check image on the recording paper A is darker, the user compares and observes the check image on the recording paper B formed in step S204 and the color patch selection image on the recording paper A formed in step S206. On the other hand, if it is determined that the check image on the recording paper B is darker, the user compares and observes the check image on the recording paper A formed in step S204 and the color patch selection image on the recording paper B formed in step S207. Then, the user selects a color patch whose lightness is closest to the check image (S208). In other words, the color of the selected color patch and that of the check image correspond to a combination of the colors of the recording paper sheets A and B, which give the same appearance.

Figure 6:
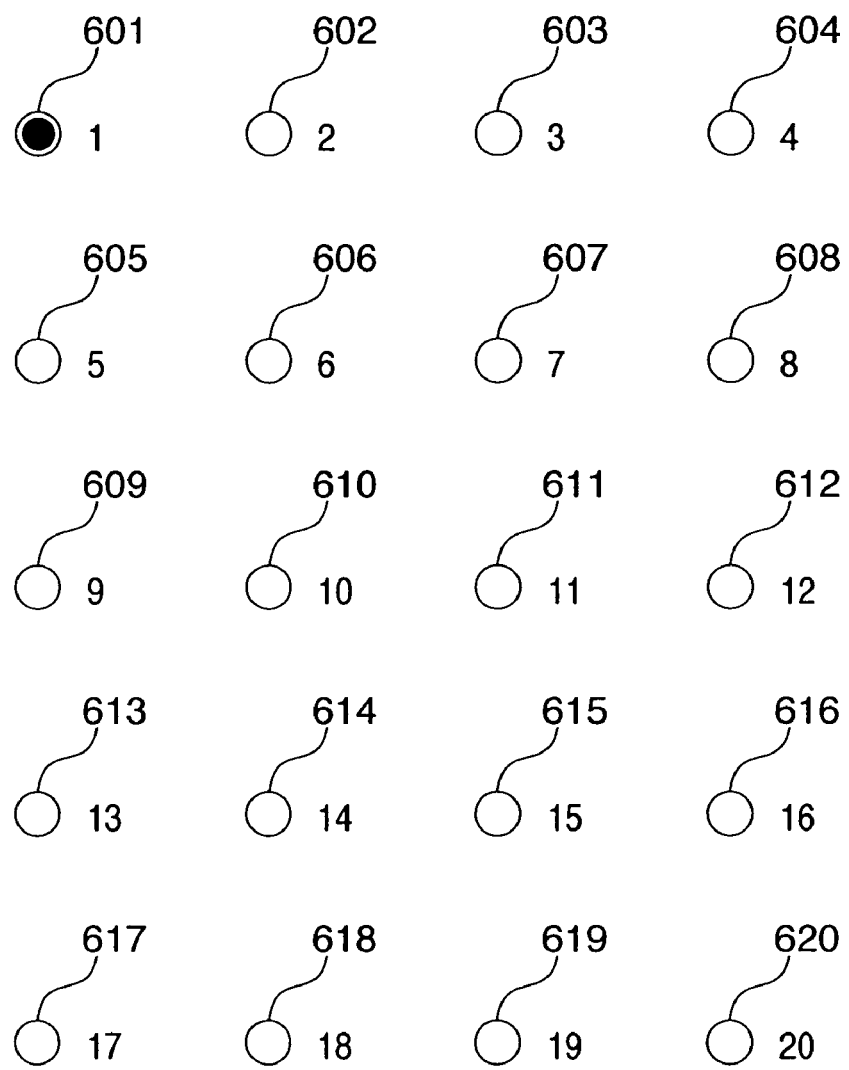
FIG. 6 shows a user interface used to obtain a user's selection result.

FIG. 6 shows a user interface used to obtain the user's selection result. The user compares the check image with the respective color patches of the color patch selection image in accordance with a message "select a color patch having the appearance closest to the check image of recording paper X" (X=A or B in this embodiment) or the like, and selects a radio button corresponding to the number of the color patch whose lightness is closest to the check image. That is, radio buttons 601 to 620 shown in FIG. 6 correspond to the respective color patches of the color patch selection images (that is, the color patch numbers in FIG. 5 correspond to the radio button numbers in FIG. 6), and one of these radio buttons is selected. Of course, the radio button can be reselected until an [OK] button 621 is clicked. Also, the user interface shown in FIG. 6 has a layout of radio buttons corresponding to that of the color patches so as to easily and surely designate a color patch.

Upon completion of step S208, or if the user selects the radio button 403 in step S205 since he or she senses that the two check images have nearly the same lightness, the tristimulus values Xa, Ya, and Za of the recording paper A and the tristimulus values Xb, Yb, and Zb of the recording paper B are calculated (S209). Note that the process in step S209 depends on the choice in step S205.

If it is determined that the check image on the recording paper A is darker (upon selection of the radio button 401), the tristimulus values Xa, Ya, and Za of the recording paper A are calculated from the colorimetric signals of the color patch selected in step S208, and the tristimulus values Xb, Yb, and Zb of the recording paper B are calculated from the colorimetric signals of the check image of the recording paper B.

If it is determined that the check image on the recording paper B is darker (upon selection of the radio button 402), the tristimulus values Xb, Yb, and Zb of the recording paper B are calculated from the colorimetric signals of the color patch selected in step S208, and the tristimulus values Xa, Ya, and Za of the recording paper A are calculated from the colorimetric signals of the check image of the recording paper A.

If it is determined in step S205 that the two check images have nearly the same lightness (upon selection of the radio button 403), the tristimulus values Xa, Ya, and Za of the recording paper A are equal to the tristimulus values Xb, Yb, and Zb of the recording paper B, and are calculated from the colorimetric signals of the check image by a known color space conversion method. In this case, since the colorimetrically identical color patches give the appearance of the same impression, the gloss character of the recording paper A is the same as that of the recording paper B, and the profile need not be corrected.

In the above description, the media profile stored in the media profile storage section 5006 shown in FIG. 7 is corrected. Alternatively, the target profile stored in the target profile storage section 5004 can also be corrected. In this case, the recording paper A may be replaced by the recording paper B in the profile correction method.

In the aforementioned embodiment, the recording paper sheets are used. For example, other recording media such as an overhead projector (OHP) film and the like may be used.

In this way, a pair of colors whose appearances match on recording media with different gloss characters are obtained, the differences between the tristimulus values of the pair of colors are obtained as those between the gloss characters, and the colorimetric signals in the profile are corrected based on the differences between the gloss characters, thus realizing the same color appearance on the recording media with different gloss characters.

Second Embodiment

A color process according to the second embodiment of the present invention will be described hereinafter. Note that the same reference numerals in the second embodiment denote the same parts as those in the first embodiment, and a detailed description thereof will be omitted.

In the first embodiment, the user compares and observes print images on the recording paper sheets A and B to obtain the pair of colors of the recording paper sheets A and B which have the closest appearances from the color patch selection image. Then, the correction amounts dX, dY, and dZ are calculated from the tristimulus values Xa, Ya, and Za of the obtained color of the recording paper A, and the tristimulus values Xb, Yb, and Zb of the obtained color of the recording paper B using equations (10).

However, in general, the selection image does not often include any color with the same appearance. Especially, since only the lightness values of the color patches of the color patch selection image of the first embodiment are changed, a color patch whose impression of lightness matches can be selected but the impression of a color tint does not often match. In this case, the impressions of lightness on the images of the recording paper sheets A and B match, but the impressions of color tints do not match by the profile correction according to the first embodiment. A large number of color patches whose saturation and hue values are changed in addition to lightness values may be prepared, and the user may select a color patch with an identical color tint impression in addition to lightness from those color patches. However, images to be output must be increased. In addition, since the user must select a color patch with the same impression from a large number of patches, the load on the user becomes heavier.

The second embodiment will explain the color process that can solve such problems.

In general, the color tint of surface-reflected light that enters the eye of the observer who observes an image depends on the chromaticity of illumination light. Hence, in the second embodiment, the chromaticity value of the illumination light is used as that of the correction amounts dX, dY, and dZ. That is, the user selects a color patch with the same lightness impression to obtain the correction value dY of luminance associated with the lightness, and dX and dZ are calculated from the chromaticity (xs, ys) of the illumination light by:

$$dX = dY \times xs/ys$$

$$dZ = dY \times (1-xs-ys)/ys \qquad (12)$$

As the chromaticity of the illumination light, that of a light source that colorimetric signals stored in the profile assume is used. For example, if the calorimetric signals stored in the profile are tristimulus values X, Y, and Z in the standard light source D50 or color signals on the Lab color space calculated from these values X, Y, and Z, the chromaticity (0.3457, 0.3586) of D50 is used as that of the illumination light. More preferably, the chromaticity of illumination light in an image observation environment may be obtained from the user and may be used.

Since the profile correction sequence in the second embodiment is the same as that in the first embodiment, a detailed description thereof will be omitted. In the second embodiment, the correction amounts dX and dZ in calculations of the correction amounts in step S102 shown in FIG. 1 are calculated using equations (12).

In this way, according to the color process of the second embodiment, since the chromaticity of the illumination light is used as that of the correction amounts dX, dY, and dZ, even when the color patches of the color patch selection image do not include any color patch whose color tint impression matches that of the color of the check image, the profile can be corrected so that the images on the recording paper sheets A and B have the same appearance.

Third Embodiment

A color process according to the third embodiment of the present invention will be described hereinafter. Note that the same reference numerals in the third embodiment denote the same parts as those in the first and second embodiments, and a detailed description thereof will be omitted.

The color process explained in the first or second embodiment is used to attain the same color appearance on the recording paper sheets A and B with different gloss characters. This color process can be used to attain the same color appearance on the recording paper sheets A and B when the calorimetric condition of calorimetric signals stored in the profile of the recording paper A is different from that of calorimetric signals stored in the profile of the recording paper B.

For example, when the colorimetric condition of calorimetric signals stored in the profile of the recording paper A is a geometric condition of illumination and light reception called D-n that uses an integrating sphere, and the colorimetric condition of colorimetric signals stored in the profile of the recording paper B is a geometric condition called d-n, the recording paper sheets A and B have different appearances even when the calorimetric signals remain the same. For this reason, good color appearance cannot be obtained using the color signal process explained in the paragraphs of the background of the invention.

The third embodiment will explain a color process that can solve the aforementioned problems.

The geometric condition of illumination and light reception has a large difference in the way surface-reflected components are handled. When measurement is made under the geometric condition called D-n using an integrating sphere, the measurement value includes surface-reflected light. On the other hand, upon measurement under the aforementioned geometric condition called 45-n or n-45 or the geometric condition called d-n, the measurement value does not include any surface-reflected light. For example, when a glossy sample is measured under the geometric condition D-n, a higher measurement value of lightness is obtained than measurement under the geometric condition d-n. In other words, when calorimetric signals of the recording paper A measured under the geometric condition D-n are equal to those of the recording paper B measured under the geometric condition d-n, the user senses that the recording paper B is brighter than the recording paper A.

In order to attain the same color appearance on the recording paper sheets A and B, a difference in the way surface-reflected light is handled must be obtained, and colorimetric signals stored in the profile must be corrected. This is the same condition as that for obtaining the same color appearance on recording paper sheets with different gloss characters, and can be realized by the color process described in the first or second embodiment. That is, the tristimulus values of the colors of the recording paper sheets A and B, which provide the same appearance, are obtained in the sequence shown in FIG. 2, and the colorimetric signals in the profile are corrected in the sequence shown in FIG. 1.

As described above, according to the color process of the third embodiment, a pair of colors which have the same appearance between the profiles of different measurement conditions are obtained, the differences between the tristimulus values of the pair of colors are obtained as those in the way surface-reflected light is handled, and the colorimetric signals in the profile are corrected on the basis of the differences in the way surface-reflected light is handled, thus attaining the same color appearance between the profiles with different measurement conditions.

Modification of Embodiments

In the first and second embodiments, the user compares and observes print images on the recording paper sheets A and B to obtain the differences between the gloss characters, which are used to calculate the correction amounts. Alternatively, the differences between the gloss characters may be obtained on the basis of measurement values associated with gloss such as reflected haze, specular glossiness, and the like, and the correction amounts may be calculated. In this case, the relationship between the measurement values and correction amounts is obtained in advance, and the correction amounts are calculated from the measurement values associated with gloss of the recording paper sheets A and B.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-059235 filed on Mar. 3, 2004 and No. 2004-371885 filed on Dec. 22, 2004, which are hereby incorporated by reference herein.

What is claimed is:

1. A color processing method of correcting a profile which holds correspondence between colorimetric data and color data of a device and corresponds to one of recording media, comprising the steps of:

obtaining colorimetric data of a first black patch formed on a target recording medium using a profile corresponding to the target recording medium;

obtaining colorimetric data of a second black patch formed on a subject recording medium using a profile corresponding to the subject recording medium in case that a user determines that color appearances of the first and second black patches are color-matched by visual observation, wherein glossiness of the subject recording medium is different from glossiness of the target recording medium;

calculating a correction amount based on the obtained colorimetric data of the first and second black patches; and correcting colorimetric data in the profile corresponding to the subject recording medium using the calculated correction amount.

2. The method according to claim 1, wherein the correcting step is not executed when a color difference between the colorimetric data of the first and second black patches is smaller than a predetermined value, and the correcting step is executed when the color difference is equal to or larger than the predetermined value.

3. A computer-readable storage medium storing a computer-executable program for causing a computer to perform a color processing method of correcting a profile which holds correspondence between colorimetric data and color data of a device and corresponds to one of recording media, the method comprising the steps of:

obtaining colorimetric data of a first black patch formed on a target recording medium using a profile corresponding to the target recording medium;

obtaining colorimetric data of a second black patch formed on a subject recording medium using a profile corresponding to the subject recording medium in case that a user determines that color appearances of the first and second black patches are color-matched by visual observation, wherein glossiness of the subject recording medium is different from glossiness of the target recording medium;

calculating a correction amount based on the obtained colorimetric data of the first and second black patches; and correcting colorimetric data in the profile corresponding to the subject recording medium using the calculated collection amount.

4. A color processing apparatus for correcting a profile which holds correspondence between colorimetric data and color data of a device and corresponds to one of recording media, said apparatus comprising:

a first obtaining section, arranged to obtain colorimetric data of a first black patch formed on a target recording medium using a profile corresponding to the target recording medium;

a second obtaining section, arranged to obtain colorimetric data of a second black patch formed on a subject recording medium using a profile corresponding to the subject recording medium in case that a user determines that color appearances the first and second black patches are color-matched by visual observation, wherein glossiness of the subject recording medium is different from glossiness of the target recording medium;

a calculator, arranged to calculate a correction amount based on the obtained colorimetric data of the first and second black patches; and a corrector, arranged to correct colorimetric data in the profile corresponding to the subject recording medium using the calculated correction amount.

5. The apparatus according to claim 4, wherein the colorimetric data and the correction amount are tristimulus values.

6. The apparatus according to claim 4, further comprising an acquisition section arranged to acquire chromaticity of illumination light, wherein said calculator calculates the correction amount from a difference value between luminance data of the colorimetric data of the first and second black patches, and the chromaticity of the illumination light.

7. The apparatus according to claim 4, wherein lightness of the second black patch is lower than lightness of the first black patch.

* * * * *